Figure 9:
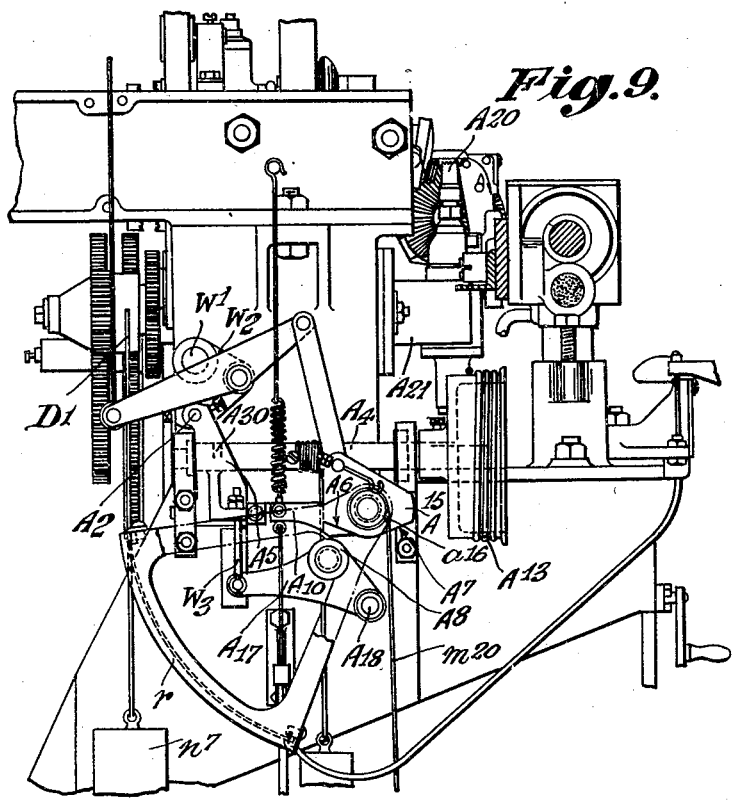

Jan. 13, 1931.  W. J. STILL  1,788,895
MACHINE FOR MANUFACTURING HEAT RADIATING ELEMENTS
Filed March 29, 1929  4 Sheets-Sheet 1
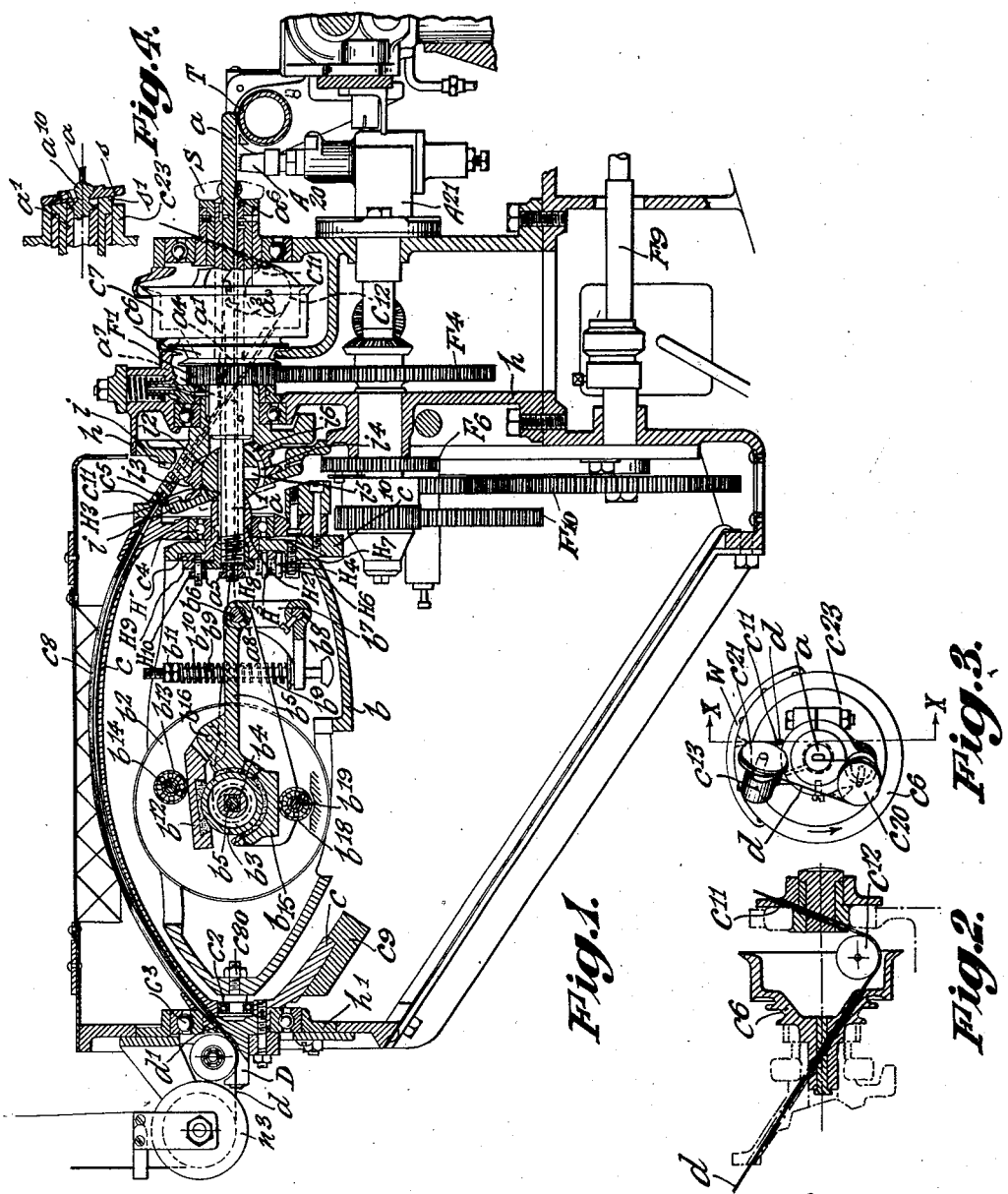

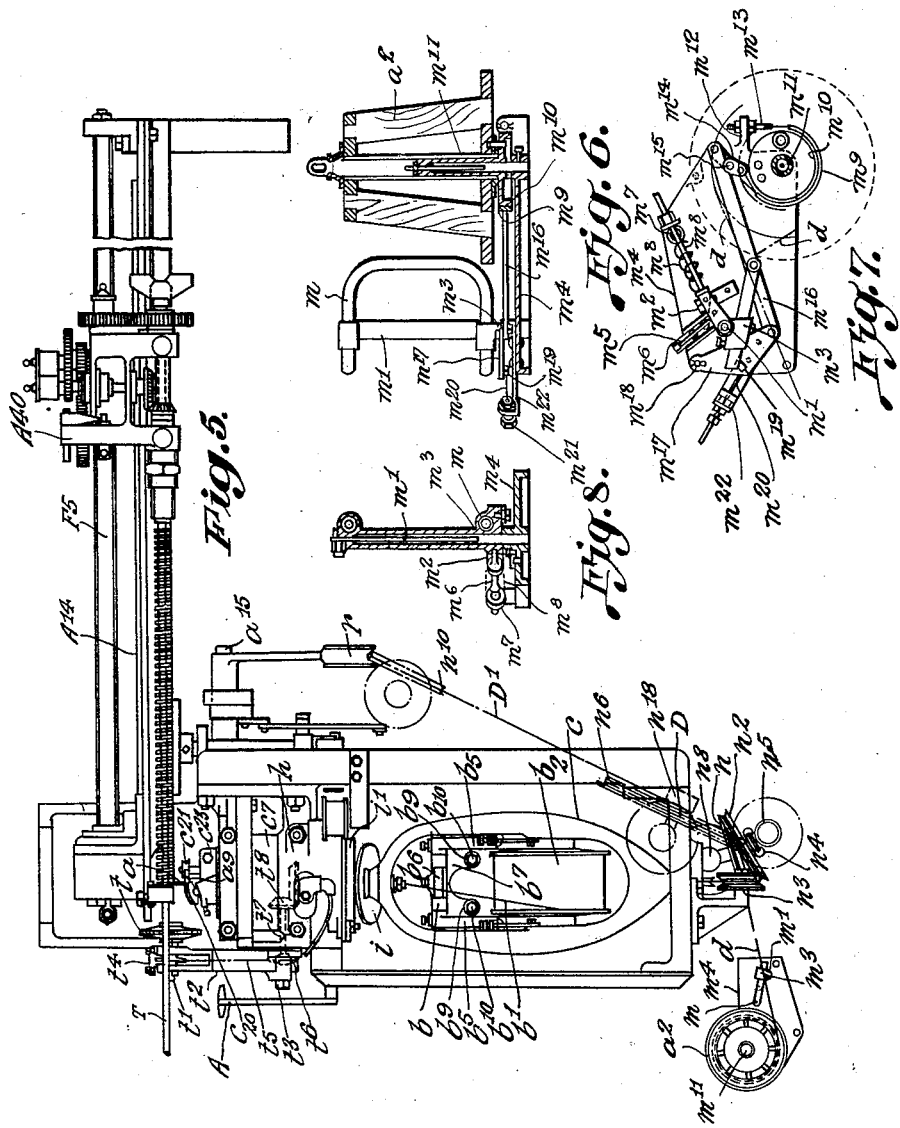

Jan. 13, 1931.  W. J. STILL  1,788,895
MACHINE FOR MANUFACTURING HEAT RADIATING ELEMENTS
Filed March 29, 1929  4 Sheets-Sheet 4

Inventor
William Joseph Still
By B. Singer, Atty.

Patented Jan. 13, 1931

1,788,895

UNITED STATES PATENT OFFICE

WILLIAM JOSEPH STILL, OF LONDON, ENGLAND

MACHINE FOR MANUFACTURING HEAT-RADIATING ELEMENTS

Application filed March 29, 1929, Serial No. 351,091, and in Great Britain April 3, 1928.

This invention relates to improvements in machines for the manufacture of heat radiating elements consisting of a tube around which a wire spiral is spirally wound, the wire spiral being held on the tube by a binding wire passing through the wire spiral.

The machine is of the kind in which the wire spiral is formed by winding the wire around a fixed mandrel the binding wire being led under tension from a spool through a hollow and longitudinally under a forming mandrel fixed on the spindle. The end of the wire is fixed on a spindle carrying a tube on which the wire spiral is to be coiled and the spindle slowly rotated by gears from a leading screw which traverses the tube as the wire spiral is being wound thereon. The axial speed of the tube is varied by changing the ratio of the gearing and in similar manner the speed of rotation of the tube is varied.

According to the present invention the wire for forming the spiral is taken directly from the swift and passed through the machine to the stationary mandrel without rewinding upon a spool carried by a rotating headstock, thus the necessity of constantly refilling the spool is avoided.

The objections to carrying a spool on a rotary wire coiling head are that the spool cannot be of a large size or of considerable weight because of the inertia stress thrown on the wire when starting and also the velocity effect which causes it to overrun when the machine is stopped and thus slack out and tangle the wire; the spool has therefore to be frequently refilled with wire.

At each refilling or replacing of the spool a joint has to be made in the wire ribbon and this means stopping the action of the machine somewhere in the length of a tube in an otherwise unnecessary manner and consequent loss of time. Also the speed of such a machine has to be curtailed to that which would enable the spool to be started up without breaking the wire and stopped without overrunning, whereas in a machine made in accordance with the present invention these limits are removed and the winding speed can be doubled; and possibly even trebled.

The swift is provided with a brake which controls the speed at which the swift revolves under tension of the wire. The present invention enables the binding wire spool of the machine to be relatively large and heavy; the more so that when for example one inch of binding wire is arranged to fasten on 20 to 30 inches of the wire wound into the spiral, the inertia factors due to mere unwinding will be as the square of this relation. Also because of this relation of 20 to 30 to 1 a spool of binding wire does not need to be replaced as frequently as a spool of spiral forming wire even when containing the same length of wire.

In order to form the spiral around the binding wire, which is the essential condition, the spiral forming wire must be carried around the binding wire spool on the way to the stationary mandrel on which it is eventually wound, and this is effected by passing it through a tube supported by a blade member which connects the rotor of the machine with a bearing carried on an extension arm at the back of the machine, the binding wire spool being supported inside the path of this blade member.

Between the swift and the rotor of the winding machine is provided loop forming mechanism whereby the tension on the wire is controlled automatically, and the loop is formed by passing the wire upwards over a sliding pulley and then downwards and over guide pulleys to the rotor of the machine, the sliding pulley being supported over pulley mechanism by a weighted cord which cord also operates control gear of the power driving mechanism.

The control of the power driving mechanism is preferably controlled by trip gear mechanism operable automatically and independently from the wire jamming on the swift, or the wire breaking, or too great a variation in the length of a wire tension controlling loop or the solder wire breaking or becoming disconnected or used up, or the desired length of tube being completed.

Figure 11:
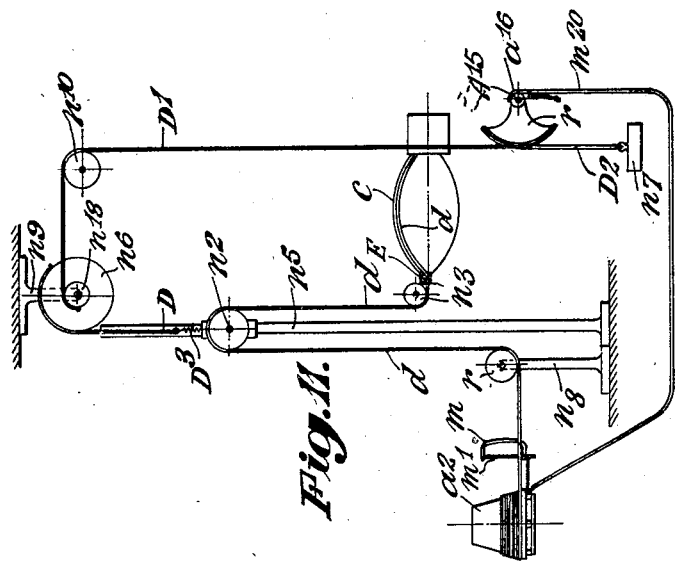
Figure 10:
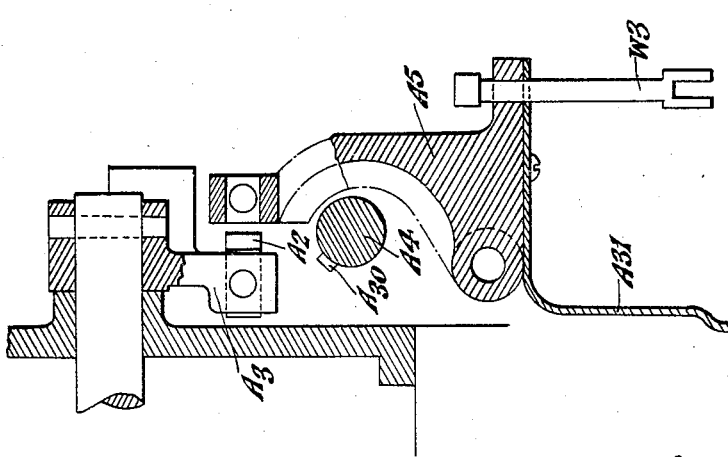

A manner of carrying out the invention is illustrated by the accompanying drawings, wherein Figure 1 is a sectional elevation through the carrier, rotor and spool of the machine, Figure 2 a sectional view of the rotor, Figure 3 is a front elevation of Figure 2, Figure 4 a sectional view of a swashing plate arranged on the mandrel of the machine, Figure 5 a general plan of the machine on a smaller scale, Figure 6 a sectional elevation of the wire swift mechanism, Figure 7 a plan of the swift mechanism, Figure 8 a sectional elevation of a detail of Figure 6, Figure 9 an elevation of a portion of the machine showing the control mechanism, Figure 10 a detail of Figure 9, and Figure 11 a diagram of the wire loop forming mechanism. As illustrated by these drawings the central part of the machine consists of a stationary mandrel $a$ carried at one end of a shaft $a1$ which at the other end is connected to a non-rotary carrier or shuttle $b$ supporting a spool $b2$ of binding wire $b1$, the whole central portion of $b$ being maintained stationary except as to the slow unwinding of wire $b1$ off the spool $b2$.

The shuttle $b$ is attached to the mandrel shaft $a1$ and held from rotation by means of a plate H1 which has a boss portion H2 in which is provided a feather H3 extending into a key way in the mandrel shaft $a1$. The plate H1 is not rigidly attached to the shuttle but is connected to it flexibly by means of a cushion spring H4 one end of which is looped round pins H5 and H6 rivetted in the plate H1 and of which the free ends pass each side of a pin H7 screwed into end of the shuttle $b$, the plate H1 being also connected to the mandrel shaft $a1$ by means of a nut H8 having a flange provided with recesses into which fit a locking plate H9 held in position by a nut and screw H10. The cushion spring H4 tends to keep the two pins H5 and H7 in alignment by opposing motion in either direction and so compensates for any vibratory action set in the gears which would hammer loose the feather H3 and the attachment of the shuttle if a rigid connection was made.

In order that the binding wire spool $b2$ will impart a definite amount of tension to the binding wire $b1$ it is clamped to two brake discs $b3$ one each side of it and by means of a square bar $b4$ the three parts rotate together and are held together by a clamping screw $b5$ which facilitates the removal of an empty spool and the replacing of it by a full one.

When the spool $b2$ is in place in the shuttle $b$ it is supported by the brake discs $b3$ on two arms $b5$ which are attached together at one end by a pin $b6$ journalled in a rocking frame $b7$ fixed on a shaft $b8$ mounted in bearings in the shuttle $b$. The rocking frame $b7$ is controlled by springs $b9$ supported by studs $b10$ screwed at their lower ends into the shuttle $b$, and arranged to press on the horizontal arm of the rocking frame $b7$. By means of the nuts $b11$ the load on the spring can be adjusted, the spring is arranged to turn the rocking frame $b7$ in such a manner as to force the brake shoes $b12$ and $b15$ which are hinged together by a pin $b16$, on to the brake discs $b3$ by a wedging action between the shoes and ball bearing rollers $b13$ and $b18$. The rollers $b13$, $b18$ are mounted on shafts $b14$ and $b19$ fixed in the shuttle $b$. The roller $b18$ supports the weight of the arms $b5$ and spool $b$ and the brake shoes $b12$ and $b15$.

The movement of the arms $b5$ is opposed by the pull of the binding wire $b1$, so that if the tension on the wire $b1$ exceeds that on the springs $b9$ the arms $b5$ are moved in such a manner as to reduce the wedging action of the rollers $b13$ and $b18$ and vice versa.

Located outside the shuttle $b$ is a rapidly rotating carrier $c$ connected at its forward end by a connecting piece $c5$ to a rotor $c6$ of which the portion $c7$ is shaped as a driving belt pulley. The rotor $c6$ rotates at one end in a ball bearing $c4$ of which the outer race is fixed in the headstock $h$ of the machine, while the back end of the carrier $c$ rotates in a ball bearing $c3$ of which the outer race is carried by the rear end $h1$ of the headstock of the machine.

On the carrier $c$ and extending from end to end thereof is a tube $c8$ formed of closely wound wire through which the spiral forming wire $d$ passes from a swift $a2$ to and through the rotor $a6$ to the stationary spiral forming mandrel $a$.

As the spiral forming wire $d$ is rotating any bearings used must encircle the wire or the bearing supports will sever it, the ball bearings $c3$ and $c4$ are therefore employed and the wire $d$ is passed through the hole $d1$ in the central portion of the carrier $c$ carrying the inner ball race of the bearing $c3$ into the tube $c8$ so that the wire $d$ will pass during the rotation of the carrier $c$ from one side of the rotating mass to the other, the ball bearings $c3$, $c4$ being relatively large in diameter and short in length their use facilitates this transference of the wire $d$.

In addition to the ball bearings $c3$ and $c4$ there is provided a third ball bearing $c2$ which supports the rear end of the fixed shuttle $b$ the outer race of this ball bearing being fixed in the rear end of the carrier $c$ while its inner race is fixed by a bolt $c80$ to the rear end of the shuttle $b$.

As the carrier $c$ rotates at a high speed it is balanced by means of balance weights $c9$ and $c10$.

The shuttle $b$ is held stationary during the rotation of the carrier $c$ and the spiral forming wire $d$ carried round the fixed mandrel by means of a swashing bevel gear $i$ meshing with a stationary gear $i1$ of equal number of teeth fixed on the front headstock $h$ of the machine, the angle between the gears $i$ and $i1$ being sufficient to permit the passage of the spiral forming wire $d$ between their teeth through the passage $c11$ in the connecting member $c5$ and through the rotor $c6$ under a roller $c12$ and through a continuation of the passage $c11$ from the outer end of which the wire passes up over guide pulleys $c20$ and $c21$ of which the shafts are supported on a former $c23$, and then over the inclined plate $a9$ carried by the spherical portion $a10$ of the mandrel $a$ and then around the mandrel itself.

The swashing gear $i$ is carried on a hardened ball $i2$ on which it is held by a gland member $i3$, the ball $i2$ being mounted on the mandrel shaft $a1$ and held from rotation therein by the feather H3. The swashing gear $i$ can rock on the ball $i2$ without rotating thereon by means of a key $i4$ forming the head of a pin $i5$ extending into the ball $i2$, the swashing gear $i$ and its gland $i3$ are provided with a curved keyway $i6$ so that it can rock over the key $i4$.

In the outer end of the mandrel shaft $a1$ is fixed an interchangeable mandrel $a$ of a cross section corresponding to the desired shape of the spiral. In order to be interchangeable the mandrel $a$ is held in place by a joint $a3$ whereby it is connected to a bolt $a4$ which is held in the mandrel shaft $a1$ by a nut $a5$ which pulls the mandrel $a$ against a shoulder $a6$. A groove $a7$ is along the bottom of the bolt $a4$ and the mandrel $a$ to form a conduit for the binding wire $b1$, at the end of the bolt the groove terminates in an inclined hole $a8$.

The hanks of spiral forming wire $d$ often contain 1 cwt. of wire, so that the problem of starting such a mass into motion with sufficient rapidity to supply the machine, when it was thrown into action, is a difficult one because only a very light tension on the wire is permissible owing to the ease with which it can be broken when bent over a mandrel of special form having abrupt edges. This difficulty is overcome by providing a storage loop where the spiral forming wire enters the back of the machine. In forming this loop the wire $d$ is passed from the swift $a2$ through the tubular staple $m$, the object of this staple is to stop the main winding machine if the wire on the hank gets caught by some under coil and thus cannot unwind from the swift. When this happens the wire $d$ gets carried around with the hank as shown by the chain line, the velocity of the swift $a2$ being then sufficient to pull the tubular staple $m$ around on its stud $m1$ supported in a base $m4$ and so move an arm $m2$ extending from a staple carrying bracket $m3$ in such a manner as to pull a Bowden wire $m5$ through a bracket $m6$ supporting the Bowden wire apparatus controlling the starting handle of the machine.

The arm $m2$ is linked to a rod $m6$ sliding through a tubular support $m7$ and controlled by a spring $m8$. The parts being so arranged that only a slight movement is necessary to bring the spring $m8$ into action which completes the swing of the arm $m2$ sufficiently to pull the Bowden wire $m5$ to release the starting handle on the main machine which returns to the off position thus releasing a clutch or other suitable drive on a countershaft.

At the same time the rotation of the arm $m2$ applies a brake $m9$ on a drum $m10$ fixed on the spindle $m11$ carrying the swift $a2$ and thereby prevents the wire $d1$ from being broken by the momentum of the swift and the wire thereon, which may weigh 1 cwt.

The brake band $m9$ is fixed at one end to a bracket $m12$ by an adjusting screw $m13$, the other end of the brake band $m9$ being connected to one end of a lever $m14$ pivoted at $m15$ to the base $m4$, while the other end of the lever $m14$ is linked to a rod $m16$. The other end of the rod $m16$ is linked to a lever $m17$ pivoted at $m18$ to the base $m4$, and carrying a pin $m19$ to which is fixed a Bowden wire $m20$ which passes through a tube $m21$ carried by a bracket $m22$ fixed to the base $m4$. The wire $m20$ is connected to the Bowden wire B of the swift brake mechanism.

From the tubular staple $m$ the wire passes under a pulley $n$ carried by a support $n8$ near the base of the machine as shown on Figure 5, and thence vertically upwards and over a sliding pulley $n2$, (see also Figure 11).

The pulley $n2$ which is preferably an aluminium one is mounted upon a slider $n4$ which runs off a guide standard $n5$ and is pulled upwards by a spring D connected to a cord which is fastened to and wrapped around a pulley $n6$ supported from a beam over the main machine.

A weight $n7$ suspended by a system of cords D, D1, D2 is of such dimensions as to impart sufficient tension to the cord D to balance the weight of the slider $n4$ and pulley $n2$ and impart a small additional tension to the cord D, this pull imposes on the wire $d$ the tension which must be imparted to it on its entrance into the machine, this tension varies with the diameter of the wire and it is evident that (as this must not exceed 2 lbs. with the smaller wires) it is insufficient to start a 1 cwt. hank of wire together with the swift on which it is mounted into motion when the main machine starts, without a considerable time is given it in which to acquire speed.

The loop of wire which extends from the floor to the slider pulley $n2$ and back to the machine level may be made to constitute a wire reservoir of say 16 ft. of stored wire when the slider $n4$ is at the top of its travel, which is the position it occupies when the machine is about to start; when therefore the machine commences to revolve and take wire from the swift $a2$ most of the supply comes from the loop which becomes shorter and shorter in the process.

The wire loop controls the brake $m9$ of the swift $a2$ by means of a cord $m20$ which is attached to a member A15 on the shaft $a16$ carrying the quadrant $r$. The quadrant $r$ is operated from the pulley $n18$ by the cord D1 of which the lower end is attached to the lower end of the quadrant $r$, while its upper end after passing over a guide pulley $n10$ is fixed to the small pulley $n18$ which is formed on or fixed to the pulley $n6$, both pulleys are carried by a hanger $n9$. The weight $n7$ is hung over the quadrant by a second cord D2 of which the upper end is connected to the upper end of the quadrant $r$, the weight $n7$ thereby imparting tension to storage loop of the spiral forming wire $d$.

It is evident that as the loop grows shorter the cord D1 will be pulled up and the quadrant partly rotated, this releases the Bowden wire $m20$ and thus allows the swift to rotate under the impulse of the tension imparted to the wire by the weight $n7$; a slight reduction in the length of the loop is sufficient to entirely release the brake $m9$ and the swift $a2$ soon acquires sufficient speed to supply wire to the machine to meet its demands, the loop being by this time much reduced in length and the brake $m9$ off. Under these conditions the swift $a2$ continues to speed up and releases wire faster than the machine requires it, the loop thus increases in length and the quadrant descends and by applying the brake $m9$ checks the speed of the swift and controls the length of the loop all this is done without causing any alteration in the tension imparted to the wire $d$. The spring D3 has been added to the loop slider $n4$, in order to absorb the sudden changes due to coils of the hank slipping off the top of the hank and thus releasing extra wire, these sudden changes would not be taken up by the weight $n7$ with sufficient quickness and when taken up would cause a shock, which would result in broken wire and which is entirely prevented by the interposition of the spring D3 between the slider $n4$ and the cord D.

The wire $d$ enters into the machine over the pulley shown at $n3$ having bearings in a bracket $n19$ fixed to the rear headstock $h1$ of the machine, the wire then passes through the guide block D and under a pulley E rotating in the guide block and then through a hole $d1$ also in the guide block into the inside of the coil spring $c8$ which rotates with the carrier $c$ around the binding wire spool $b2$.

The guide block D and the pulley E are preferably case hardened to withstand the cutting action of the wire and these parts rotate with the rear end of the carrier $c$ to which they are attached.

After leaving the wire spring tube $c8$, the wire $d$ enters a hole $c11$ in the connector arm $c5$ attached to the front rotor and passes through it under a pulley $c12$ therein and emerges from the front of the machine through the hole $c11$ where it passes over pulleys $c20$ and $c21$ on to the mandrel $a$ on which it is wound. The pulleys $c20$ and $c21$ are mounted on a head or former $c23$ rotating with the rotor $c7$ and carrier $c$ in the direction indicated by Figure 3, and the pulley $c21$ is so disposed relatively to the pulley $c20$ and is of such a size that the wire $d$ will be given a bend sufficient to ensure the spiral having flat sides by counteracting the curve that would otherwise be formed when winding the wire $d$ round a mandrel $a$ having flat sides as in the present case. To facilitate the delivery of the spiral from the end of the former the inclined plate or swashing member $s$ bearing on the inclined faced bush $s1$ rocks on the spherical portion $a10$ of the mandrel as the wire passes over its front face rotation being prevented by a key in the swashing member sliding in a key way provided in the spherical portion $a10$ see Figure 4.

A wire scratch brush $t$ is provided for cleaning the tube T to facilitate the soldering thereon of the spiral wound from the wire $d$. The brush $t$ is fixed on a spindle $t1$, mounted in a rocking arm $t2$ pivoted to the machine at $t3$. On the spindle $t1$ is a sprocket wheel $t4$ driven by a chain $t5$ from a sprocket wheel $t6$ fixed on a shaft $t7$ driven by mitre wheels $t8$ driven from the driving gear of the machine.

The best results are obtained by forming on the wire spiral a surface of contact for engagement with the tube, and this is effected by means of a milling cutter A20 arranged under the mandrel $a$ on which the wire spiral is being formed and immediately before it is coiled round the tube T. In the present improvements this milling cutter A20 is driven from the machine by a spiral gear in the casing A21 preferably working in an oil bath supplied from the main bearings of the milling cutter which are preferably lubricated by a pressure feed system. This gearing may be completely enclosed in the casing A21 and the bearings arranged to leak outwards so that the apparatus will be protected from the dust produced by the milling cutter. The use of a spiral drive enables the milling cutter spindle to be pressed upwards against the wire coil by means of a spring, and the pitch angle of the spiral gear and the driving mechanism of the gear to be so arranged that should the milling cutter tend to dig into the wire ribbon the increased drive will tend to withdraw the cutter and so ensure even cutting action.

The operation of the machine is as follows:—

A full spool $b2$ of binding wire $b1$ is inserted in the shuttle $b$, the rotor $c6$ being turned so that an opening at one side of the end of the rotor c faces upward to facilitate this, the square bar b4 is then threaded through the spool b2 and screwed into a nut in one of the brake discs b3 thus locking the spool b2 in place.

Wire b1 is now drawn off the spool b2 and threaded through the mandrel holding shaft a1 until it issues from the head or former c23 to the front of the machine. The copper wire d is now threaded through the tubular staple m and over the pulleys of the hook mechanism and through the carrier c and rotor as described above. If the rotor c6 has been turned so that the wire tube c8 is at the top and then be threaded through the hole and lowered on to the pulley c12 it will now pass through the machine freely from the hank on the swift when pulled from the front. If the wire is now given a few right hand turns around the mandrel a and the starting handle of the machine pulled forward the rotor c6 will revolve and form ribbon like spiral around the mandrel a and the binding wire b1 which lies under it and in contact with it. As soon as the mandrel a is covered with spiral wire ribbon the machine should be stopped and the binding wire clipped to a tube T which has been inserted in the tube T which has been inserted in the tube support of the machine.

Upon restarting the machine the tube T will rotate and the spiral ribbon as formed will be withdrawn from the former and bound on to the tube. In order to facilitate soldering of the spiral of the tube T a spool of wire solder is provided at the front of the machine and wire from this spool is attached to a clip on the tube T and is thus wound on to the tube as it rotates, one thread of solder being wound on to the tube between each coil of the spiral wire. When the machine has been put into operation winding spiral ribbon on to a tube T which may be effected by any suitable mechanism whereby the tube is moved axially while being rotated at a speed relatively to the axial movement to give the desired pitch to the winding it can be left unattended because its operation thenceforward is quite automatic.

The machine is provided with a weight controlled starting handle A which brings into operation the power or driving mechanism, and being so controlled the starting handle A would return to the off position as soon as released and stop the machine if it were not held by a detent A2, which is supported in the casting A3 and this casting is connected with the starting handle by a shaft W1 which passes through the machine from one side to the other. The detent A2 engages with a corresponding detent held coaxially thereto in the arm A5.

Under normal conditions the starting handle when pulled forward remains in this position being retained there by the detent A2 but if the condition of the machine is not suitable for complete and satisfactory operation the detent does not retain it there and the handle returns automatically to the off position when released.

The detent A2 is preferably arranged to be withdrawn in the following circumstances:—
1. Solder wire broken or disconnected.
2. Wire d jammed on the swift.
3. Wire d broken.
4. Wire loop too long.
5. Wire loop too short.
6. Spiral wire d or solder wire exhausted.
7. Length of tube completed.

The last is the usual reason why the machine stops, and this is produced by the contact and motion of the stop fixed to a control cord A13, this cord extends the full length of the tube carriage rail A14 under which it is located and the tube carriage is provided with an arm which makes contact with the stop at any desired position and by pulling the cord rotates the shaft A4 and by a stud A30 thereon pushes an arm A5 controlled by a spring A31 back carrying the detent A2 upon it out of engagement with the one A2 on arm A3, this releases the starting handle and stops the machine.

If the wire loop becomes too long or too short the quadrant r of the loop control mechanism brings the projections A6 or A7 of a rocking member A15 on the shaft a16 into contact with a roller A8 on the member A17 rocking on the shaft A18, and this also pulls down the release arm A5 by means of the rod W3 and stops the machine. If the wire d is exhautsed it either catches in the last few loops around the swift and acts like case 2 or flies off loose and acts like case 3 which by releasing the tension allows the slider n4 to rise up beyond the proper position and thus bring the projection on the loop control into action.

In case 2 the stopping of the machine is not due to the undue short ending of the loop for the tubular staple m before referred to is thrown over and this by pulling on the Bowden wire m5 attached to it pulls down an arm A10 on the shaft a16 Figure 10 and thus operates the roller A8. The machine is therefore stopped without waiting for the loop to be unduly shortened.

A similar arm not shown on the drawings is provided on the shaft a16 and is operated by the weight of a solder wire spool not shown on the drawings and of which the mechanism operates the roller A8 and releases the detent and stops the machine. A hand release is fitted to the machine and arranged to operate the arm A5 so that the machine can be stopped by hand at any time.

In order to fasten the binding wire to the tube by clip or otherwise it is necessary to cut the ribbon and wind the binding wire only on to the tube; to provide for this a ratchet drive is provided.

In the gearing of the ribbon winding mechanism the first reduction shaft F is driven by the gears F1 and F4 (Figure 1) by means of the rotor c7 and this shaft F operates the milling cutter A20 situated under the mandrel a on which the spiral ribbon is wound also the gears driving a long splined shaft F5 which rotates a tube chuck and traverses a tube carriage A40.

When the rotor c6 is stopped and it is desired to wind binding wire only, the clutch in the gear F6 is put into operation to drive the train of wheels F10, by this means the second reduction shaft F9 is turned, the tube carriage is operated and binding wire is wound on to the tube T without any ribbon upon it.

A clip can then be placed over the binding wire to fasten it to the tube T, and the binding wire severed, the tube can then be removed and a new one inserted.

The table carrying the tube supporting spindle may be traversed by any suitable mechanism such as leading screw gearing or by rack and pinion gearing in which the pinion is rotated by gearing from a splined shaft rotated by gearing driving or driven from the rotary head coiling the wire on the fixed mandrel.

What I claim and desire to secure by Letters Patent is:—

1. A machine for forming a wire spiral and also for winding it spirally round a tube, comprising a continuously rotatable member having a non-axial passage extending through it, a stationary mandrel fixed relatively to the rotating member, and means for winding the spiral formed in the machine round the tube, the spiral forming wire being passed through the passage in the rotatable member and then transversely on to the stationary mandrel, the mandrel being arranged to deliver the spiral formed thereon on to the tube.

2. A machine for forming a wire spiral and also for winding it spirally round a tube, comprising a continuously rotatable member having a hollow portion and a non-axial passage extending through it and also an axial hole passing from its inner side to the end, a stationary mandrel fixed co-axially with reference to the rotating member, a binding wire carrying swift, a shuttle for supporting the binding wire swift, and means for winding the spiral formed in the machine round the tube, the spiral forming wire being passed through the non-axial passage, while the shuttle is nonrotatively fixed co-axially in the rotating member and the swift of binding wire is rotatively mounted therein and the wire from the swift passed through the rotary member by way of its axial hole and then through the wire spiral being wound round the tube.

3. A machine for forming a wire spiral and also for winding it spirally round a tube, comprising a rotor, having a non-axial passage extending through it, a carrier also having a non-axial passage extending through it, a fixed member around which the rotor rotates, a stationary mandrel, and means for winding the spiral formed in the machine round the tube, the rotor being connected to the carrier so that both rotate together, and the spiral forming wire being passed through the passage in the carrier and then through the passage in the rotor and then transversely on to the stationary mandrel, the stationary mandrel being fixed to the fixed member and arranged to deliver the spiral formed thereon on to the tube.

4. A machine for forming a wire spiral and also for winding it spirally round a tube, comprising a continuously rotatable member having a hollow portion and a non-axial passage extending through it and also an axial hole passing from its inner side to the end, a stationary mandrel fixed coaxially with reference to the rotary member, a binding wire carrying swift, a shuttle for supporting the binding wire swift, an automatic wire tensioning device, and means for winding the spiral formed in the machine round the tube, the spiral forming wire being passed through the non-axial passage, while the shuttle is non-rotatively fixed co-axially in the rotating member and the swift of binding wire is rotatively mounted therein and the wire from the swift passed through the rotary member by way of its axial hole and then through the wire spiral being wound round the tube, the wire tensioning device being supported in the shuttle and operated automatically by the tension in the binding wire between its winding on the tube and its unwinding from the swift in the shuttle.

5. A machine for forming a wire spiral and also for winding it spirally round a tube, comprising a continuously rotatable member having a hollow portion and non-axial passage extending through it and also an axial hole passing from its inner side to the end, a stationary mandrel fixed coaxially with reference to the rotary member, a binding wire carrying swift, a shuttle for supporting the binding wire swift, a brake disc fixed on the swift, brake blocks engaging the brake disc on opposite sides and having oppositely disposed inclined operating surfaces, fixed rollers engaging the oppositely disposed inclined surfaces of the brake blocks, a pivoted lever carrying the brake blocks, a brake spring, and means for winding the spiral formed in the machine round the tube, the spiral forming wire being passed through the non-axial passage, while the shuttle is nonrotatively fixed coaxially in the rotating member and the swift of binding wire is rotatively mounted therein and the wire from the swift passed through the rotary member by way of its axial hole and then through the wire spiral being wound round the tube, the brake elements being movably mounted in the shuttle and the brake spring operating the pivoted lever to force the inclines of the brake block between the fixed rollers and so control the tension on the wire.

6. A machine for forming a wire spiral and also for winding it spirally round a tube, comprising a continuously rotatable member having a non-axial passage extending through it, a stationary mandrel fixed relatively to the rotating member, a milling cutter, and means for winding the spiral formed in the machine round the tube, the spiral forming wire being passed through the passage in the rotatable member and then transversely on to the stationary mandrel, the mandrel being arranged to deliver the spiral formed thereon over the milling cutter on to the tube, the milling cutter being arranged to produce a flat on the spiral at the portion to be in contact with the tube.

7. A machine for forming a wire spiral and also for winding it spirally round a tube, comprising a continuously rotatable member having a hollow portion and a non-axial passage extending through it and also an axial hole passing from its inner side to the end, a stationary mandred fixed co-axially with reference to the rotating member, a binding wire carrying swift, a shuttle for supporting the binding wire swift, a swash plate having face gear teeth, a corresponding fixed gear wheel, a spherical bearing for the swash plate, and means for winding the spiral formed in the machine round the tube, the spiral forming wire being passed through the non-axial passage, while the shuttle is non rotatively fixed co-axially in the rotating member and the swift of binding wire is rotatively mounted therein and the wire from the swift passed through the rotary member by way of its axial hole and then through the wire spiral being wound round the tube, the spherical bearing of the swash plate being fixed and the spiral forming wire carried round the fixed mandrel by the gear teeth of the swash plate engaging those of the fixed gear wheel thereby permitting the rotation of the non-axial passage of the spiral forming wire.

In witness whereof I affix my signature.

WILLIAM JOSEPH STILL.